US012570932B2

(12) United States Patent
St. Peter et al.

(10) Patent No.: US 12,570,932 B2
(45) Date of Patent: Mar. 10, 2026

(54) REMOVAL AND PREVENTION OF BIOFILM BY NANOPARTICLE CHEMISTRIES

(71) Applicant: ChampionX LLC, Sugar Land, TX (US)

(72) Inventors: Cruz St. Peter, Saint Paul, MN (US); Ramakrishnan Balasubramanian, Saint Paul, MN (US); Duy Nguyen, Sugar Land, TX (US); Rangarani Karnati, Saint Paul, MN (US)

(73) Assignee: ChampionX LLC, Sugar Land, TX (US)

( * ) Notice: Subject to any disclaimer, the term of this patent is extended or adjusted under 35 U.S.C. 154(b) by 151 days.

(21) Appl. No.: 16/441,820

(22) Filed: Jun. 14, 2019

(65) Prior Publication Data

US 2019/0382693 A1 Dec. 19, 2019

Related U.S. Application Data

(60) Provisional application No. 62/685,610, filed on Jun. 15, 2018.

(51) Int. Cl.

| | |
|---|---|
| ***C11D 3/48*** | (2006.01) |
| ***A01N 25/04*** | (2006.01) |
| ***A01N 33/12*** | (2006.01) |
| ***A01N 35/02*** | (2006.01) |
| ***A01N 37/16*** | (2006.01) |
| ***A01N 57/34*** | (2006.01) |
| ***A01N 59/06*** | (2006.01) |
| ***C11D 3/12*** | (2006.01) |
| ***C11D 17/00*** | (2006.01) |

(52) U.S. Cl.

CPC ................ *C11D 3/48* (2013.01); *A01N 25/04* (2013.01); *A01N 33/12* (2013.01); *A01N 35/02* (2013.01); *A01N 37/16* (2013.01); *A01N 57/34* (2013.01); *A01N 59/06* (2013.01); *C11D 3/1213* (2013.01); *C11D 17/0013* (2013.01); *C11D 2111/20* (2024.01)

(58) Field of Classification Search

CPC ..... C11D 3/48; C11D 3/1213; C11D 17/0013; C11D 2111/20; A01N 25/04; A01N 33/12; A01N 35/02; A01N 37/16; A01N 57/34; A01N 59/06

USPC .......................................................... 424/405

See application file for complete search history.

(56) References Cited

U.S. PATENT DOCUMENTS

| | | | |
|---|---|---|---|
| 4,042,402 A | 8/1977 | Drake et al. | |
| 5,200,189 A * | 4/1993 | Oakes | C11D 3/48 424/405 |
| 5,741,483 A | 4/1998 | Okawa | |
| 6,267,979 B1 * | 7/2001 | Raad | C12N 1/38 424/405 |
| 6,764,601 B1 | 7/2004 | Levy et al. | |
| 6,838,005 B2 | 1/2005 | Tepper et al. | |
| 7,491,337 B2 | 2/2009 | Karaman | |
| 9,943,785 B2 | 4/2018 | Jeong | |
| 2003/0029812 A1 * | 2/2003 | Burns | C02F 1/50 210/764 |
| 2012/0141805 A1 | 6/2012 | Wang et al. | |
| 2013/0211310 A1 | 8/2013 | Bommarito et al. | |
| 2013/0306529 A1 | 11/2013 | Flaim et al. | |
| 2014/0353256 A1 | 12/2014 | Kaschek et al. | |
| 2015/0018317 A1 * | 1/2015 | Ji | A01N 57/20 514/126 |
| 2016/0151724 A1 * | 6/2016 | Jeong | B01D 39/2027 210/295 |
| 2017/0049113 A1 | 2/2017 | Duncan et al. | |
| 2017/0173642 A1 | 6/2017 | Li et al. | |
| 2018/0141822 A1 | 5/2018 | Holland et al. | |
| 2018/0168150 A1 | 6/2018 | Li et al. | |

FOREIGN PATENT DOCUMENTS

| | | |
|---|---|---|
| CN | 108341440 A | 7/2018 |
| EP | 0900178 B1 | 3/1999 |
| EP | 1025756 B1 | 8/2000 |
| EP | 1825752 B1 | 8/2007 |
| EP | 2088225 B1 | 8/2009 |
| EP | 2616172 B1 | 7/2013 |
| JP | 2004351269 A | 12/2004 |
| WO | 0181249 A1 | 11/2001 |

OTHER PUBLICATIONS

Rosenblum (Journal of Chemical Engineering, vol. 4, Issue 2, pp. 1978-1984) (Year: 2016).*

Balaure et al., "Bioactive mesoporous silica nanostructures with anti-microbial and anti-biofilm properties", International Journal of Pharmaceutics, vol. 531, pp. 35-46, Aug. 4, 2017.

Bhattacharyya et al., "Nanomaterials: Source of antimicrobial products", Antimicrobials Synthetic and Natural Compounds book, Chapter 20, 16 pages, ebook published Dec. 1, 2015.

Chrzanowska et al., "The impacts of aluminum and zirconium nano-oxides on planktonic and biofilm bacteria", Journal Desalination and Water Treatment, vol. 52, Issue 19-21, Jun. 2014.

Das et al., "Nano-silica fabricated with silver nanoparticles: antifouling adsorbent for efficient dye removal, effective water disinfection and biofouling control", Nanoscale, vol. 5, pp. 5549-5560, Apr. 8, 2013.

Duncan et al., "Nanoparticle-Stabilized Capsules for the Treatment of Bacterial Biofilms", American Chemical Society, vol. 9, No. 8, pp. 7775-7782, Jun. 17, 2015.

(Continued)

*Primary Examiner* — Walter E Webb

(74) *Attorney, Agent, or Firm* — McKee, Voorhees & Sease, PLC

(57) ABSTRACT

Methods and compositions for biofilm removal in industrial applications and systems with prevalent biofilm and/or slime are disclosed. Various industrial processing, such as food and beverage processing, mining pipelines, cooling towers, and energy services applications benefit from the biofilm removal disclosed herein. In particular, the methods and compositions employ alumina nanoparticles alone or in combination with conventional biocides to remove biofilm and/or slime.

12 Claims, 2 Drawing Sheets

(56) References Cited

OTHER PUBLICATIONS

Gholap et al., "Hierarchical nanostructures of Au@ZnO: antibacterial and antibiofilm agent", Appl Microbiol Biotechnol, vol. 100, pp. 5849-5858, Feb. 11, 2016.
Ghosh et al., "Nano-structured mesoporous silica/silver composite: Synthesis, characterization and targeted application towards water purification", Materials Research Bulletin, vol. 88, pp. 291-300, Dec. 30, 2016.
Grumezescu et al., "Prevention of Microbial Biofilms—The Contribution of Micro and Nanostructured Materials", Current Medicinal Chemistry, vol. 21, No. 29, 1 page, 2014.
Hoseinzadeh et al., "Review on Nano-Antimicrobials: Metal Nanoparticles, Methods and Mechanisms", Current Drug Metabolism, vol. 18, pp. 120-128, Nov. 10, 2016.
Jastrzebska et al., "Influence of bacteria adsorption on zeta potential of Al2O3 and AL2O3/Ag nanoparticles in electrolyte and drinking water environment studied by means of zeta potential", Surface & Coatings Technology, vol. 271, pp. 225-233, 2015.
Mehregan et al., "Al2O3 Nanopowders, a Suitable Compound for Active Control of Biofouling", Journal of Nano Research, vol. 32, pp. 71-80, Mar. 30, 2015.
Palencia et al., "Interaction Mechanisms of Inorganic Nanoparticles and Biomolecular Systems of Microorganisms", Current Chemical Biology, vol. 9, pp. 10-22, 2015.
Ronen et al., "Journal Desalination and Water Treatment", vol. 51, pp. 988-996, Jan. 2013.
Evonik Industries, "AerodispW925", Safety Data Sheet, 1 page, printed Jun. 12, 2018.
Nalco, An Ecolab Company, "Nalco 8676", Safety Data Sheet, 1 page, Issuing date Mar. 25, 2014.
Slomberg et al., "Role of Size and Shape on Biofilm Eradication for Nitric Oxide-Releasing Silica Nanoparticles", ACS Applied Materials & Interfaces, vol. 5, pp. 9322-9329, Sep. 5, 2013.
Oquendo-Cruz et al., "Synthesis, Characterization and Bactericide Properties of Al2O3 Nanoparticles and Al2O3—PAN Membranes for Alternative Water Disinfection Methods", Cambridge Core, vol. 2, Issue 30, pp. 1605-1610, 2017.
Zhang et al., "Antibacterial Dental Composites with Chlorhexidine and Mesoporous Silica", J Dent Res., vol. 93, pp. 1283-1289, 2014.

* cited by examiner

REMOVAL AND PREVENTION OF BIOFILM BY NANOPARTICLE CHEMISTRIES

CROSS-REFERENCE TO RELATED APPLICATIONS

This application claims priority to Provisional Application U.S. Ser. No. 62/685,610 filed Jun. 15, 2018, which is incorporated herein by reference in its entirety.

FIELD OF THE INVENTION

The invention relates to the field of biofilm removal and prevention technologies and, more particularly, to methods and compositions for removal of biofilm and/or slime in industrial applications and systems with prevalent biofilm, including for example industrial processing, such as food and beverage processing, mining pipelines, cooling towers, and energy services applications. In particular, the methods and compositions employing alumina nanoparticles are beneficial for biofilm removal in the petroleum industry.

BACKGROUND OF THE INVENTION

Water systems are an integral part of process operations in many industries. For continuous plant productivity, these systems require proper treatment and preventative maintenance. In industrial and commercial water systems corrosion, scale, fouling and biological contamination are major issues which have to be taken into account to withstand significant problems. If not properly controlled, these problems have a direct, negative impact on the value of the entire process or operation, such as leading to higher energy consumption, operational expenditure, accelerated corrosion and the generation of antibiotic resistant strains, which create significant health and economic problems. Biofouling is a problem in various commercial and industrial applications that employ water systems. For example, biofouling plays an important role in microbiologically influenced corrosion.

Biofouling is caused by a biomass—which is the buildup of microorganisms and/or extracellular substances and by dirt or debris that become trapped in the biomass. Bacteria, fungi, yeasts, diatoms and protozoa are only some of the organisms which cause buildup of a biomass. Biofilm biomasses are highly resilient microbial assemblies that are difficult to eradicate and the bacteria living in a biofilm are considerably more resistant to host defenses and antibiotic or antimicrobial treatments. Some microorganisms attach to inert surfaces forming aggregates with a complex matrix consisting of extracellular polymeric substances (EPS). This consortium of attached microorganisms and the associated EPS is commonly referred to as a biofilm. Biocides have difficulty penetrating biofilms and removing them from surfaces. Although excessive biocide dosages may be able to control biofouling, such use is costly.

The presence of microorganisms in commercial and industrial waters cannot be totally eliminated, even with the excessive use of chemical biocides. The most common way to control biofouling is through the application of chemical biocides such as chlorine (e.g. hypochlorite) or other caustic compositions, bromine, isothiazolones, glutaraldehyde or other antimicrobials. The traditional metric for biocide efficacy in bulk solution systems is kill against microbes suspended in solution, so-called planktonic microbes. Removal of the planktonic microbes—or the inhibition of biofilm formation is a preferred method as it prevents bacterial adhesion on a surface (i.e. colonization). However, it is the microbes agglomerated on surfaces, biofilms, so-called sessile microbes, that significantly affect the process and operation of systems, including water systems.

There has been commercial interest in using nanomaterials to prevent biofilm formation. Nanotechnology is a scientific and engineering technology conducted at the nanoscale and nanomaterial applications for antimicrobial activity has been an area of substantial research. Nanomaterials are known to be excellent adsorbents due to their large specific surface area and high reactivity. Various metal oxide nanoparticles (NPs) including $Al_2O_3$, $TiO_2$, ZnO, CuO, $Co_3O_4$, $In_2O_3$, MgO, $SiO_2$, $ZrO_2$, $Cr_2O_3$, $Ni_2O_3$, $Mn_2O_3$, CoO, and Nickel oxide demonstrate toxicity toward several microorganisms. Most prevalent are silver nanoparticles, photocatalytic $TiO_2$, ZnO nanoparticles, and chitosan nanoparticles which have generally shown antimicrobial activity. There is an ongoing commercial need for improved use of nanoparticle technologies for biofilm removal from surfaces within water systems.

Accordingly, it is an objective of the claimed invention to develop a method of removing biofilm from a surface in commercial and industrial water systems.

A further object of the invention provides compositions effective in mitigating and/or eliminating biofilm from a surface.

Other objects, advantages and features of the present invention will become apparent from the following description taken in conjunction with the accompanying Examples.

BRIEF SUMMARY OF THE INVENTION

An advantage of the invention is effective management or kill of sessile microorganisms in various industrial and commercial water systems through the use of alumina nanoparticle containing compositions described herein. The compositions and methods of employing the same in various water systems, including oil and gas applications, overcome a significant need in the art for improved methods which reduce microbe and/or slime growth on surfaces, e.g. biofilms. These and other unexpected benefits achieved by the present invention are disclosed herein.

While multiple embodiments are disclosed, still other embodiments of the present invention will become apparent to those skilled in the art from the following detailed description, which shows and describes illustrative embodiments of the invention. Accordingly, the detailed description and its Examples are to be regarded as illustrative in nature and not restrictive.

BRIEF DESCRIPTION OF THE DRAWINGS

The invention will be further described with reference to the drawings.

Figure 1:
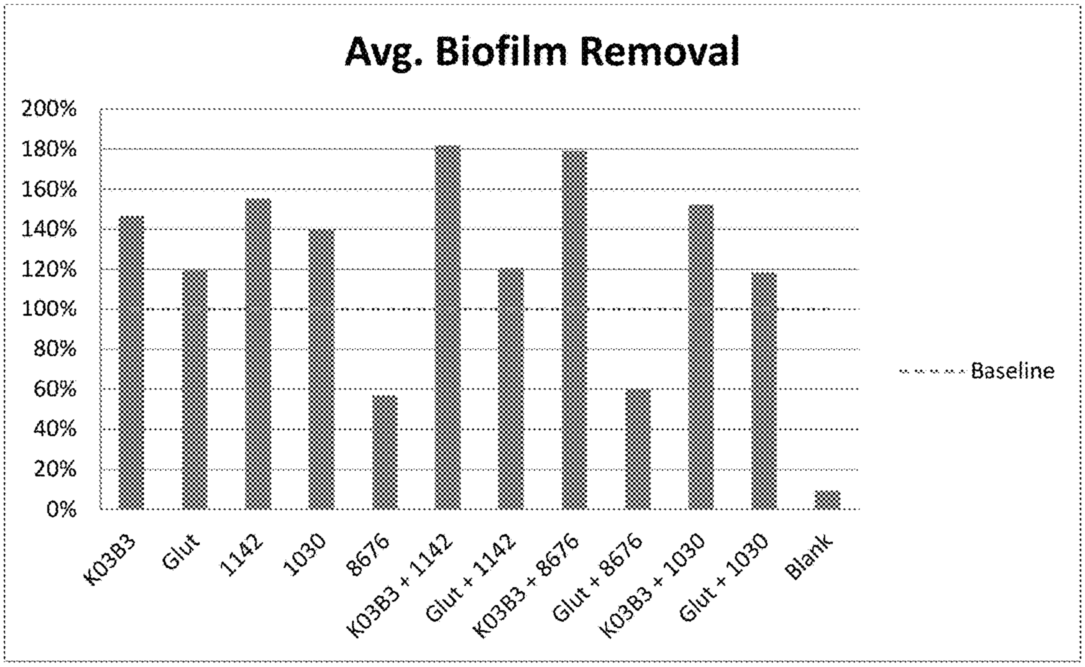
FIG. 1 shows a graph of the relative biofilm removal after treatment with 1000 ppm total active chemistry compared to baseline to evaluate several treatment compositions as described in Example 1.

While the above-identified figures set forth several embodiments, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF THE PREFERRED EMBODIMENT

The present invention relates to biofilm removal and prevention in various applications and industries. The alumina nanoparticle compositions and methods of employing the same have many advantages over conventional biocides utilized for biofilm prevention and/or removal. For example, the alumina nanoparticle compositions of the invention are not only effective in removing biofilms, they are further effective for reducing or preventing microbe growth in solution and growth on surfaces.

The embodiments of this invention are not limited to particular methods or alumina nanoparticle compositions, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those ingredients involved in cleaning expressed as a percentage minus inert ingredients such as water or salts.

A "biofilm" refers to a population of microorganisms including bacteria attached to an inert or living surface. Bacteria in a biofilm are enmeshed in an extracellular polymer matrix, generally a polysaccharide matrix, which holds the bacteria together in a mass, and firmly attaches the bacterial mass to the underlying surface making the biofilm difficult to eradicate from a water source or water system.

As used herein, the term "microorganism" refers to any noncellular or unicellular (including colonial) organism. Microorganisms include all prokaryotes and eukaryotes. Microorganisms include bacteria (including cyanobacteria), spores, lichens, fungi, protozoa, virinos, viroids, viruses, phages, and some algae. As used herein, the term "microbe" is synonymous with microorganism and includes without limitation, one or more of bacteria (e.g., motile or vegetative, Gram positive or Gram negative), bacterial spores or endospores, algae, fungi (e.g., yeast, filamentous fungi, fungal spores), mycoplasmas, and protozoa, as well as combinations thereof. In some cases, the microorganisms of particular interest are those that are pathogenic, and the term "pathogen" is used to refer to any pathogenic microorganism. Examples of pathogens can include, but are not limited to, both Gram positive and Gram negative bacteria, fungi, and viruses including members of the family Enterobacteriaceae, or members of the family Micrococaceae, or the genera *Staphylococcus* spp., *Streptococcus*, spp., *Pseudomonas* spp., *Enterococcus* spp., *Salmonella* spp., *Legionella* spp., *Shigella* spp., *Yersinia* spp., *Enterobacter* spp., *Escherichia* spp., *Bacillus* spp., *Listeria* spp., *Campylobacter* spp., *Acinetobacter* spp., *Vibrio* spp., *Clostridium* spp., *Klebsiella* spp., *Proteus* spp. and *Corynebacterium* spp. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "nanoparticle (NP)" refers to particulate systems, dispersions or solids with at least one cross section of the particle (one or more dimensions of the particle) in the nanoscale between about 1-115 nm. Nanoparticles generally can be made from organic, inorganic or organic-inorganic materials with different sizes and shapes (e.g., nanotubes, fullerenes, nanowires, quantum dots and amorphous NPs). Inorganic NPs include for example AgNPs, silver oxide ($Ag_2$ONPs), TiO2NPs, silicon (SiNPs), copper oxide (CuONPs), nickel oxide (NiONPs), zinc oxide (ZnONPs), gold (AuNPs), calcium oxide (Ca—ONPs), magnesium oxide (MgONPs), aluminum oxide ($Al_2O_3$NPs) and bimetallic NPs such as AgCuNPs. In preferred aspects of the methods, the nanoparticles are alumina nanoparticles and do not include other organic or inorganic materials, such as silver and/or silica nanoparticles. In preferred aspects of the methods, the nanoparticles consist of or consist essentially of alumina nanoparticles.

As used herein, the terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "waters" includes food process, transport waters, and water in industrial and/or energy service applications. Food process or transport waters include produce transport waters (e.g., as found in flumes, pipe transports, cutters, slicers, blanchers, retort systems, washers, and the like), belt sprays for food transport lines, boot and hand-wash dip-pans, third-sink rinse waters, water-based process streams such as cooling tower water stream or papermaking process water stream, and the like. Waters also include domestic and recreational waters such as pools, spas, recreational flumes and water slides, fountains, and the like. Waters in industrial and/or energy service applications include for example: aquifer water, river water, sea water, produced water, fresh water, water for injection, secondary flooding water, hot water or feedwater, ethanol/bio-fuels process waters, pretreatment and utility waters, membrane system liquids, ion-exchange bed liquids, water used in the process/manufacture of paper, ceiling tiles, fiber board, microelectronics, E-coat liquids, electrodeposition liquids, process cleaning liquids, oil exploration services liquids, oil well completion fluids, oil well workover fluids, drilling additive fluids, oil fracturing fluids, oil and gas wells, flowline water systems, natural gas water systems, or the like. In an embodiment, the water for the methods described herein does not include water in need of purification. In a still further embodiment, the water for the methods described herein is also not treated with a filter (e.g., as is often done in water purification methods and systems).

The term "weight percent," " .%," "wt-%," "percent by weight," "% by weight," and variations thereof, as used herein, refer to the concentration of a substance as the weight of that substance divided by the total weight of the composition and multiplied by 100.

Alumina Nanoparticle Compositions

According to an embodiment aluminum containing nanoparticle compositions are employed for various industrial and commercial water systems, namely to reduce and/or remove biofilm growth. Preferably, alumina nanoparticle compositions are employed for the reduction and/or removal of biofilm growth. The alumina nanoparticles are preferably colloidal alumina nanoparticles in aqueous dispersions wherein the dispersions are preferably water. In an embodiment, the alumina nanoparticles can form a crystalline structure. As referred to herein, a "colloid" is a stable homogeneous composition having alumina nanoparticles dispersed through an aqueous phase, wherein the nanoparticles do not settle out from the aqueous phase and cannot be separated out by ordinary filtering or centrifuging like those in a suspension. The alumina nanoparticle colloids have a stable solid phase dispersed in a continuous or substantially continuous aqueous phase. Colloids can be formed according to various methods known in the art. The skilled artisan will appreciate that "stable" means that the solid phase of the colloid is present, dispersed through the medium and stable throughout this entire pH range with effectively no precipitate. The solid phase in an embodiment is amorphous and has a number of nanoparticles that are generally spherical in shape. The colloidal nanoparticles have a diameter in the range of about 2 nanometers (nm) to about 115 nm.

In an aspect, the alumina nanoparticle compositions are aluminum oxides (as alumina is commonly referred to as the oxide of aluminum having the formula $Al_2O_3$), and most preferably colloidal aluminum oxides. Exemplary alumina nanoparticle includes aluminum chlorohydrate and aluminum chloride hydroxide. An exemplary alumina nanoparticle is commercially-available as N8676 (Ecolab Inc.) which is a 10% colloidal alumina ($Al_2O_3$).

Without being limited to a particular mechanism of action, alumina nanoparticles provide a positive charge for the nanoparticle and provide beneficial microbial adsorption to the negatively charged substrate, namely the difficult to remove and/or inhibit biofilm. However, as a further benefit the alumina nanoparticles provide a cost effective and non-toxic treatment option in comparison to conventional metal oxide nanoparticles such as silver oxides.

In an aspect, the compositions include one or more alumina nanoparticles having an average particle size when taking the measurement of one or more dimensions that is less than about 115 nm, preferably less than about 110 nm. In an aspect, the alumina nanoparticles have an average particle size from about 1 nm to about 110 nm, or from about 2 nm to about 110 nm. Beneficially, the nanoparticles provide a high surface area suitable for absorbing to a substrate such as microbial population in a biofilm. In some embodiments, the nanoparticles are spherical nanoparticles.

In an aspect, the concentration of alumina nanoparticles is sufficient to sanitize a water system, water source or portion thereof. In a further aspect, the concentration of alumina nanoparticles is sufficient to control the problematic and difficult to remove and/or inhibit biofilms and/or slide without reducing the process or operation of the water system. In an embodiment, the alumina nanoparticles are applied at a concentration between about 0.1 ppm and about 2000 ppm, between about 0.5 ppm and about 1000 ppm, between about 1 ppm and about 1000 ppm, between about 10 ppm and about 500 ppm, or between about 15 ppm and about 2500 ppm. In preferred embodiments, the alumina nanoparticles are applied at a concentration between about 0.1 ppm and about 62.5 ppm, or between about 125 ppm and about 500 ppm.

The pH of the compositions can vary depending on the water system or water source that is being treated. However, it is generally expected that many, although not all, water systems or water sources treated with the compositions of the invention will have a pH less than about 9, or between about 6 and about 9; less than about 8, or between about 6 and about 8; or more preferably a pH between about 7 and about 8 to provide a neutral composition based on the isoelectric point (pH(I)) of aluminum to provide an electrically neutral to positively charged aluminum molecule.

Biocides

According to an additional embodiment the alumina nanoparticle compositions are combined with a biocide for treatment of the various industrial and commercial water systems, namely to reduce and/or remove biofilm growth. The alumina nanoparticles are not bioactive compounds against the biofilm, and instead act as dispersants for contacting and penetrating the biofilm. In an embodiment, a combination of a biocide with the alumina nanoparticle composition is desired. Although in situations where only dispersion and prevention of colonization is required, a biocide does not need to be combined with the alumina nanoparticle.

In some embodiments, the alumina nanoparticle compositions do not include another inorganic nanoparticle, such as inorganic metal nanoparticles (e.g. silver, silica, titanium). In various aspects, the treated systems comprising an alumina nanoparticle are suitable to replace standard water systems treatment compositions (e.g., hypochlorite or bromide).

Biocides suitable for combining with the alumina nanoparticle compositions can include oxidizing and non-oxidizing biocides. Suitable biocides can include one or more of the following: aldehydes (e.g., formaldehyde, glutaraldehyde, and acrolein), amine-type compounds (e.g., quaternary amine compounds (also referred to as quaternary ammonium compounds) and cocodiamine), peroxycarboxylic acids (i.e. peracid compositions), quaternary phosphonium salts (e.g., tetrakis(hydroxymethyl)phosphonium sulfate (THPS)), halogenated compounds (e.g., bronopol and 2-2-dibromo-3-nitrilopropionamide (DBNPA)), sulfur compounds (e.g., isothiazolone, carbamates, and metronidazole), hypochlorite or bromide. Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

In treated systems employing the alumina nanoparticles in combination with a biocide, the compositions can comprise from about 0.1 wt-% to about 20 wt-% biocide, from about 0.1 wt-% to about 20 wt-% alumina nanoparticles, and water. In a further embodiment, the alumina nanoparticles in combination with a biocide can comprise from about 1 wt-% to about 15 wt-% biocide, from about 1 wt-% to about 15 wt-% alumina nanoparticles, and water. In a still further embodiment, the alumina nanoparticles in combination with a biocide can comprise from about 5 wt-% to about 10 wt-% biocide, from about 5 wt-% to about 10 wt-% alumina nanoparticles, and water.

Quaternary Ammonium Compounds

In an aspect, the quaternary ammonium compounds can include for example any suitable quaternary ammonium compounds or salts including for example, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof.

Peroxycarboxylic Acids

In an aspect, any suitable peroxycarboxylic acid composition can be employed. Peroxycarboxylic (or percarboxylic) acids generally have the formula $R(CO_3H)_n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. Peroxycarboxylic acids can be made by the direct action of an oxidizing agent on a carboxylic acid, by autoxidation of aldehydes, or from acid chlorides, and hydrides, or carboxylic anhydrides with hydrogen or sodium peroxide.

In an aspect, the peracid compositions can also include an organic acid and an oxidizing agent. In a still further aspect, the peracid composition can be a peracid forming composition. In various aspects, the peracid composition can be formed by an organic acid and an oxidizing agent. In other aspects, peracid forming compositions may be employed to generate a peracid composition in situ. Additional description of exemplary in situ methods for peracid forming compositions is provided in U.S. Pat. Nos. 8,846,107 and 8,877,254, which are herein incorporated by reference in its entirety.

Peroxycarboxylic acids may include short chain and/or medium chain peroxycarboxylic acids. As used herein, a "short chain peracid" refers to a peroxycarboxylic acid having a carbon chain between 1 and 4 carbons. As used herein, the phrase "medium chain peracid" refers to a peroxycarboxylic acid having a carbon chain between 5 and 22 carbons in length. Further as used herein, the phrase "medium chain carboxylic acid" can refer to a carboxylic acid that has a critical micellar concentration greater than 1 mM in aqueous buffers at neutral pH. It is also common for medium chain carboxylic acids to have a disfavorable odor. Medium chain carboxylic acids exclude carboxylic acids that are infinitely soluble in or miscible with water at 20° C. Medium chain carboxylic acids include carboxylic acids with boiling points (at 760 mm Hg pressure) of 180 to 300° C. In an embodiment, medium chain carboxylic acids include carboxylic acids with boiling points (at 760 mm Hg pressure) of 200 to 300° C. In an embodiment, 20 medium chain carboxylic acids include those with solubility in water of less than 1 g/L at 25° C. Examples of medium chain carboxylic acids include pentanoic acid, hexanoic acid, heptanoic acid, octanoic acid, nonanoic acid, decanoic acid, undecanoic acid, and dodecanoic acid. In one embodiment, the medium chain peroxycarboxylic acid employed within the compositions of the invention is a C5 to C22 peroxycarboxylic acid. In a preferred embodiment, a C5 to C18 peroxycarboxylic acid is employed in the compositions described herein. In a more preferred embodiment, a C5 to C12 peroxycarboxylic acid is employed in the compositions described herein.

As used herein, the phrase "short chain peroxycarboxylic acid" refers to the peroxycarboxylic acid form of a short chain carboxylic acid (i.e., C1 to C4). Short chain peracids have the benefit of often being highly miscible in water at 25° C. Examples of short chain carboxylic acids include formic acid, acetic acid, propionic acid, and butyric acid. In some embodiments, the compositions and methods of the present invention include peroxyacetic acid or acetic acid. Peroxyacetic (or peracetic) acid is a peroxycarboxylic acid having the formula: $CH_3COOOH$. Generally, peroxyacetic acid is a liquid having an acrid odor at higher concentrations and is freely soluble in water, alcohol, ether, and sulfuric acid. Peroxyacetic acid can be prepared through any number of methods known to those of skill in the art including preparation from acetaldehyde and oxygen in the presence of cobalt acetate. A solution of peroxyacetic acid can be obtained by combining acetic acid with hydrogen peroxide. In a preferred embodiment, the compositions of the invention employ a C1 to C4 peroxycarboxylic acid.

Peroxycarboxylic acids useful in the compositions and methods of the present invention include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, or the peroxyacids of their branched chain isomers, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and mixtures thereof. In some embodiments, the compositions of the invention utilize a combination of several different peroxycarboxylic acids. For example, in some embodiments, the composition includes one or more C1 to C4 peroxycarboxylic acids and one or more C5 to C22 peroxycarboxylic acids. In one aspect of the invention the ratio of short chain peracid to medium chain peracid can be about 2:1 to about 10:1, preferably from about 4:1 to about 8:1, more preferably about 5:1 to about 7:1, and most preferably about 6:1.

Sulfoperoxycarboxylic Acids

The compositions and methods as described herein can optionally include the use of a sulfoperoxycarboxylic; however, it should be understood that the compositions and methods may also exclude sulfoperoxycarboxylic acids. Sulfoperoxycarboxylic acids (or sulfopercarboxylic) acids generally have the formula

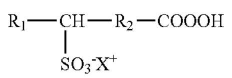

wherein $R_1$ is hydrogen, or a substituted or unsubstituted alkyl group; $R_2$ is a substituted or unsubstituted alkyl group; X is hydrogen, a cationic group, or an ester forming moiety; or salts or esters thereof. In some embodiments, $R_1$ is a substituted or unsubstituted $C_m$ alkyl group; X is hydrogen a cationic group, or an ester forming moiety; $R_2$ is a substituted or unsubstituted $C_n$ group; m=1 to 10; n=1 to 10; and m+n is less than 18, or salts, esters or mixtures thereof. In some embodiments, $R_1$ is hydrogen. In other embodiments, $R_1$ is a substituted or unsubstituted alkyl group. In some embodiments, $R_1$ is a substituted or unsubstituted alkyl group that does not include a cyclic alkyl group. In some embodiments, $R_1$ is a substituted alkyl group. In some embodiments, $R_1$ is an unsubstituted $C_1$-C9 alkyl group. In some embodiments, $R_1$ is an unsubstituted $C_7$ or $C_8$ alkyl. In other embodiments, $R_1$ is a substituted $C_8$-$C_{10}$ alkyl group.

Additional description of particularly suitable sulfoperoxycarboxylic acids is disclosed in U.S. Pat. No. 8,344,026 and U.S. patent application Ser. Nos. 12/568,493 and 13/290,355 which are herein incorporated by reference in their entirety. In some embodiments, the compositions of the invention utilize a combination of several different sulfoperoxycarboxylic acids. For example, in some embodiments, the composition includes one or more C1 to C4 sulfoperoxycarboxylic acids and one or more C5 to C22 and more preferably C5 to C12 sulfoperoxycarboxylic acids.

Oxidizing Agent

The compositions may also include an oxidizing agent. Oxidizing agents include for example, the following types of compounds or sources of these compounds, or alkali metal salts including these types of compounds, or forming an adduct therewith: hydrogen peroxide, urea-hydrogen peroxide complexes or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2[B_2(O_2)_2(OH)_4].6H_2O$ (also called sodium perborate tetrahydrate); sodium peroxyborate tetrahydrate of the formula $Na_2B_2(O_2)_2[(OH)_4]4H_2O$ (also called sodium perborate trihydrate); sodium peroxyborate of the formula $Na_2[B_2(O_2)_2(OH_4]$ (also called sodium perborate monohydrate); group 14 (IVA) oxidizing agents, for example persilicates and peroxycarbonates, which are also called percarbonates, such as persilicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as peroxymonosulfuric and peroxydisulfuric acids, and their salts, such as persulfates, for example, sodium persulfate; and group VIIa oxidizing agents such as sodium periodate, potassium perchlorate. Other active inorganic oxygen compounds can include transition metal peroxides; and other such peroxygen compounds, and mixtures thereof.

Additional Functional Ingredients

The alumina nanoparticle compositions may also include additional functional ingredients. Additional functional ingredients suitable for use in the present compositions include, but are not limited to, scale inhibitors, corrosion inhibitors, anionic polymers, stabilizing agents, surfactants, acidulants or other pH modifiers, hydrotropes, dispersants, antimicrobial agents (e.g. hypochlorite, bromide and the like), solidification agent, aesthetic enhancing agent (i.e., colorant (e.g., pigment), odorant, or perfume), wetting agents, defoaming agents, thickening or gelling agents, solvents, among any number of constituents which can be added to the composition. Such adjuvants can be preformulated with the compositions or added to the compositions after formation, but prior to use. The compositions can also contain any number of other constituents as necessitated by the application, which are known and which can facilitate the activity of the present compositions.

Methods of Biofilm Removal

The methods employing the alumina nanoparticle compositions are suitable for various applications in industrial or commercial water systems and/or water sources. For example, it is contemplated that the compositions are suitable for system sanitation (e.g. tank/vessel/pipe sanitation).

According to an embodiment the invention, methods for reducing and/or eliminating microbial populations in a water system or source are provided. In some aspects, the methods of treating microbial populations are effective for killing one or more of the pathogenic bacteria associated biofilm production and/or biofouling. Such bacteria include a wide variety of microorganisms, such as aerobic and anaerobic bacteria, including Gram positive and Gram negative bacteria, yeast, molds, bacterial spores, viruses, etc. In further aspects, the methods of treating microbial populations are effective for removing slime in addition to microbial populations associated biofilm production and/or biofouling.

In a preferred aspect, the alumina nanoparticle compositions and methods of employing the same for reducing and/or eliminating microbial populations in a water system and/or source maintain water system operations and performance. Water systems and/or sources according to the invention include, but are not limited to, cooling systems, including, but not limited to cooling towers, cooling basins, and reactor cooling systems; food, beverage and industrial process waters; pulp and paper mill systems; brewery pasteurizers; sweetwater systems; air washer systems; oil field drilling fluids and muds; petroleum recovery processes; mining pipelines; pipelines containing water; fire water; industrial lubricants; cutting fluids; heat transfer systems; cooling system; cooling towers; gas scrubber systems; latex systems; clay and pigment systems; decorative fountains; water intake pipes; ballast water tanks; and ship reservoirs.

According to a further embodiment, methods for replacing and/or reducing conventional chemical biocides in water system processes are provided. In an embodiment, the use of a alumina nanoparticle composition in the water system process is in combination with conventional chemical biocides.

The methods may comprise, consist of and/or consist essentially of one or more of the following steps: sanitizing a water system; sanitizing one or more water system vessels, pipes and/or components (including downstream equipment employed for the water system); sanitizing a water source or other component with an alumina nanoparticle composition; and the like. In another embodiment of the invention, the steps may include adding an alumina nanoparticle composition to a water system to provide microbistatic effect. In some embodiments, the compositions and methods can provide both a sanitizing effect and a microbistatic effect.

In an aspect, the treatment of a water source with the alumina nanoparticle composition reduces the colonization of target microorganisms within a biofilm by at least 20%, at least 40%, at least about 50%, at least about 60%, at least about 70%, at least about 80%, at least about 90%, or about 100%. In some embodiments, contacting the alumina nanoparticle compositions to the biofilm can completely remove the biofilm (i.e., the composition is toxic to greater than 90%, or 99% or 99.9% of the bacterial cells of the biofilm). In an aspect, the reduction and/or removal of microorganisms within a biofilm is achieved within at least 1 day, at least 2 days, at least 3 days, at least 4 days, at least 5 days, at least 6 days, or at least 7 days. In an embodiment, an alumina nanoparticle composition is dosed to a water source at least once per week to reduce and/or remove microorganisms within a biofilm. In certain embodiments, the target organisms comprise one or more of *Escherichia coli, Pseudomonas aeruginosa, Staphylococcal bacteria, Enterobacteriaceae bacteria*, and *Streptococcus bacteria*. In certain embodiments, the target organisms comprise *Pseudomonas aeruginosa.*

In an embodiment of the methods, an alumina nanoparticle composition is introduced into a vessel or system/apparatus employed for water systems to sanitize the surface against unwanted bacterial agents. The introduction of the alumina nanoparticle composition is employed for removing biofilm from a variety of hard surfaces, which may include clean-in-place systems (CIP) and/or clean-out-of-place systems (COP). For water system processes, COP systems may include for example readily accessible systems including tanks/vessels, removable system parts, and the like. For water system processes, CIP systems may include the internal components of tanks, lines, pumps and other process equipment used for processing typically liquid product streams. Beneficially, the treatment of the various CIP and/or COP portions of the system are uniquely suited to the water systems which rely heavily on internal recycling water. Such internal recycling is well suited to the methods employing alumina nanoparticle compositions as these compositions that have sufficient longevity and compatibility with the water system source/materials.

In further embodiments of the methods, an alumina nanoparticle composition is introduced to a water source, including water sources that are a byproduct of oil extraction applications. This water is reused, recycled or reinjected into disposal wells and the formation of bacteria into colonized biofilms in the presence of water is deleterious to such reuse, recycling and/or reinjection. Introduction of the alumina nanoparticle composition, either alone or in combination with a biocide, beneficially disrupt and remove biofilms in the treated water source and surfaces in contact with the water source. The methods of treating a water source with the alumina nanoparticle composition and optionally a conventional biocide also beneficially alleviate the microbiologically induced corrosion caused by these biofilms. The use of the alumina nanoparticle compositions also beneficially assist the biocides commonly used in the oil and gas industries to penetrate biofilms.

In a preferred aspect, the alumina nanoparticle composition is introduced (e.g. injected) into a water system, such as through a pipe or vessel. In a further aspect, the alumina nanoparticle composition is introduced upstream from a tank. Such introduction may further be in combination with traditional cleaning and sanitation practices that are routinely performed on the water system.

In some embodiments, the alumina nanoparticle composition (along with any additional biocides) are drained from the moving water system. However, in other aspects, the alumina nanoparticle composition (or a portion thereof) remains in the vessel or water system instead of being drained therefrom. A stagnant water system may take advantage of not requiring draining of the compositions. The amount of alumina nanoparticle composition remaining in the vessel may vary according to the desired level of sanitization and dependent upon the stability of the alumina nanoparticle composition. As referred to herein, the vessel or water system does not include a water purifier, water filtration (using any variety of methods e.g. porous filters, membranes, plates) or small scale water storage, except as described herein. Purifiers conventionally employ filters, such as a ceramic filter, a cartridge filter, and/or a mineral filter, which can be installed inside of a purifier or its storage vessel, which are not required for efficacy according to the methods described herein employing the alumina nanoparticle compositions.

It is to be understood that the methods employ an aqueous alumina nanoparticle composition. In addition, either a concentrate or use concentration of the alumina nanoparticle compositions can be applied to or brought into contact with an object by any conventional method or apparatus for applying an antimicrobial or cleaning compound to an object. For example, the object can be poured on, foamed on, and/or immersed in the compositions, or a use solution made from the compositions. The compositions can be sprayed onto a surface; the compositions can be caused to flow over the surface, or the surface can be dipped into the compositions. These and other methods of contacting an object or a surface with the alumina nanoparticle composition are within the scope of the invention. Contacting can be manual or by machine.

The methods may include the introduction of the alumina nanoparticle compositions at a temperature in the range of about 0° C. to 150° C., from about 4° C. to 150° C., or from about 4° C. to 60° C. depending upon the application of use. After introduction of the alumina nanoparticle composition, the alumina nanoparticle composition (e.g. solution) is held in the vessel and/ or circulated throughout the system for a time sufficient for removal of the biofilm and/or sanitization (e.g., to kill undesirable microorganisms).

The contact time can vary based upon the concentration of the alumina nanoparticle compositions, method of applying the alumina nanoparticle compositions, temperature conditions, amount of soil, microorganisms or contamination on the surface or apparatus to be treated, or the like. In some aspects the alumina nanoparticle compositions may be retained in the water system. In some aspects the exposure time can be at least about 60 seconds, or more. In some aspects, the contacting can be under conditions effective to treat the biofilm, for example for a time of 5 minutes to 5 hours, 10 minutes to 5 hours, 20 minutes to 5 hours, or 1 hour to 3 hours. As one skilled in the art will ascertain from the disclosure of the methods, the amount of contact time can vary based on factors including temperature, concentration of the alumina nanoparticle composition, whether the treatment is stagnant or in a moving water system, and the like. After the biofilm and/or slime has been removed, the alumina nanoparticle compositions may be removed (e.g. drained from the system) or retained (in whole or in part) in the system for additional cleaning and/or sanitizing benefit.

In some embodiments, the methods of the invention may further employ pressure and/or mechanical action with the application of the alumina nanoparticle composition. As one of skill in the art will appreciate, mechanical action may include for example, agitation, rubbing, brushing, etc. Agitation can be by physical scrubbing of the surface (e.g. tank), through the action of the spray solution under pressure, through sonication, or by other methods. Agitation increases the efficacy of the spray solution in killing micro-organisms, perhaps due to better exposure of the solution into the crevasses or small colonies containing the micro-organisms. The spray solution, before application, can also be heated to increase efficacy.

As one of skill in the art will ascertain as being within the scope of the invention, the amount of alumina nanoparticle composition provided to a water system will vary based upon a number of factors. For example, the size, structural orientation, materials employed therein, contamination level of the system, and the like will affect the amount (and/or concentration) of alumina nanoparticle composition applied thereto. In some aspects, hundreds of gallons of alumina nanoparticle composition (e.g. solution) may be provided to a water system. In other aspects, thousands of gallons of alumina nanoparticle composition (e.g. solution) may be provided to a water system.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

EXAMPLE 1

Several nanoparticle products, including silica and alumina particles, were tested for their ability to both remove biofilms from a surface as well as prevent biofilm adherence to a surface. Results herein suggest alumina nanoparticles are effective at biofilm removal. Initial screening was completed at a 1000 ppm active level to assess ability to remove biofilm. The evaluated compounds are shown in Table 2.

TABLE 2

| Name | Chemical | % Active |
|---|---|---|
| K03B3 | ADBAC Quaternary Amine [n-Alkyl (5% C12, 60% C14, 30% C16, 5% C18) dimethyl benzyl ammonium chlorides] | 91.9 |
| Glut | Glutaraldehyde | 50 |
| 1142 | Silica Nanoparticle (15 nm) [Amorphous Silica (Silicone Dioxide)] | 40 |
| 1030 | Silica Nanoparticle (13 nm) [Amorphous Silica (Silicone Dioxide)] | 30 |
| 8676 | Colloidal Alumina Nanoparticle (2 nm) [Aluminum oxide] | 10 |

All microbial efficacy tests were performed using pure cultures of *Pseudomonas aeruginosa*, a model organism for biofilm studies. The biofilm removal experiments were completed using a high-throughput method where *P. aeruginosa* was cultured in tryptic soy broth media and plated on 96-well plates, and allowed to form biofilm over the course of 48 hours. After incubation, the biofilms were treated with various chemistries or nanoparticles at 1000 ppm active for one hour. The biofilms were then stained with crystal violet, and analyzed on a microplate reader. Results are reported in FIG. 1 is an average of seven replicates and shows the relative biofilm removal after treatment with 1000 ppm total active chemistry (±SD; n=7). Untreated wells on the 96-well plate were normalized to 100% ("Baseline"), and treatments were reported as relative percentages to untreated wells. Several wells were not inoculated with bacteria, and serve as a "blank" for the quantitative data from the microplate reader. Blank did not include a biofilm for control.

The results in FIG. 1 show growth if percentage removal exceeds the baseline (i.e. above 100%) whereas removal of biofilm is depicted by a percentage below the baseline, as shown for the 8673 and Glut+8676 tests. Out of all products tested in the initial screening, only 8676 exhibited tendency to remove biofilm. The Glut+8676 assay showed similar performance to 1000 ppm active 8676 alone, suggesting ability of alumina nanoparticles to remove biofilm at lower concentrations. In various applications of treating water sources it can be beneficial to combine a biocide with the alumina nanoparticle, such as glutaraldehyde or ADBAC quat.

EXAMPLE 2

Figure 2:
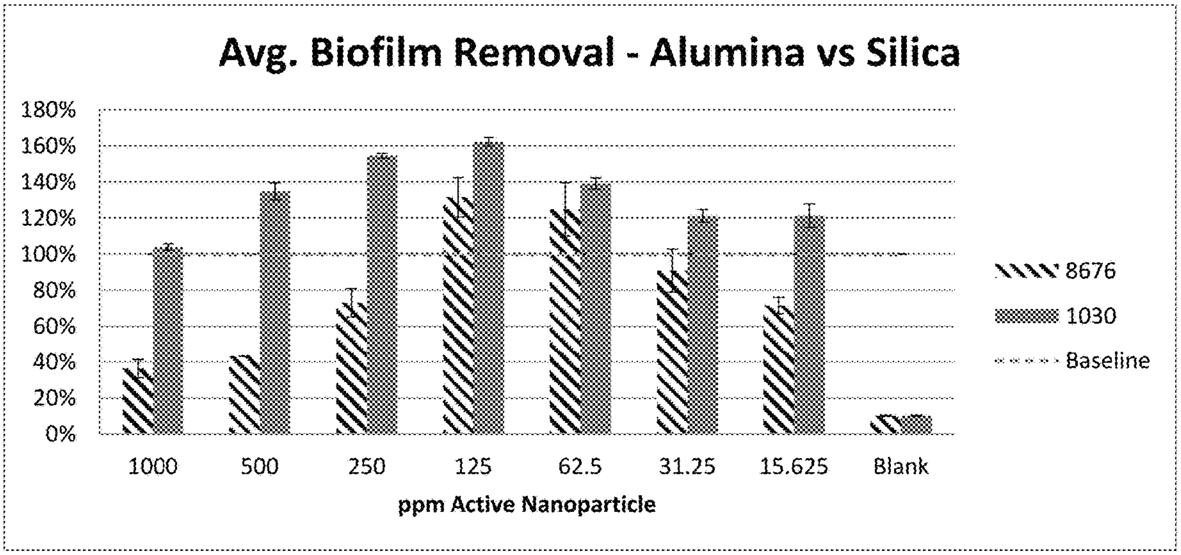
FIG. 2 shows a graph of the relative biofilm removal comparing alumina nanoparticle and silica nanoparticle compositions as described in Example 2.

Based on the screening of Example 1, alumina nanoparticles were tested for concentration dependency in ability to remove biofilm. 8676 was serially diluted two-fold (1000 ppm, 500 ppm, 250 ppm, 125 ppm, 62.5 ppm, 31.25 ppm, 15.625 ppm active nanoparticle) and biofilms were treated as described in Example 1. Again several wells were not inoculated with bacteria, and serve as a "blank" for the quantitative data from the microplate reader. Blank did not include a biofilm for control. 1030 (silica) was used as a negative control for biofilm removal suggested by results from FIG. 1. Results are shown in FIG. 2 and illustrate that alumina nanoparticles partially remove biofilm from a surface at concentrations as low as 15.625 ppm, while silica nanoparticles do not exhibit tendency to remove biofilm at the tested concentrations, demonstrating that beneficial performance of the alumina nanoparticle in comparison to conventional silica nanoparticles.

EXAMPLE 3

Based on the evaluated performance of alumina nanoparticles found in evaluated composition 8676, additional alumina products were evaluated for their affinity to remove biofilm. Table 3 shows each alumina nanoparticle product and its particle size in nanometers. No other differences in formulations besides size were evaluated. All formulations were colloidal alumina oxides in water.

TABLE 3

Aluminum Oxide Nanoparticles

| Product | Particle size (nm) | % Actives | pH | Density @ 20° C. | Viscosity (mPa s) |
|---|---|---|---|---|---|
| 8676 | 2 | 10 | 5.0 | 1.13 | <15 |
| Aerodisp W440 | 120 | 39-41 | 3.0-5.0 | 1.38 | ≤1000 |
| Aerodisp W630 | 140 | 29-31 | 3.0-5.0 | 1.26 | ≤2000 |
| Aerodisp W925 | 110 | 24-26 | 3.0-5.0 | 1.20 | ≤1000 |

Figure 3:
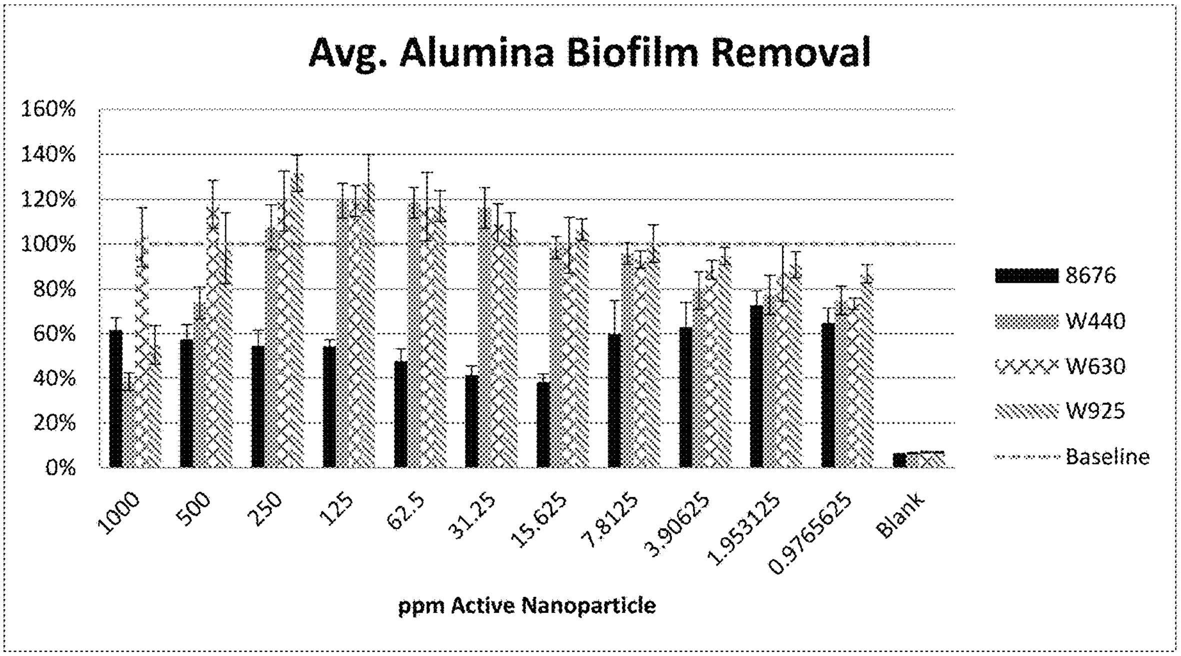
FIG. 3 shows a graph of the relative biofilm removal after treatment with varying-sized alumina nanoparticles as described in Example 3.

High-throughput biofilm removal assays were prepared using the method of Example 1, and mature biofilm was treated with the alumina nanoparticle products. A serial two-fold dilution was used to test active alumina between 1000 ppm and <1 ppm. Results depicted in FIG. 3 show relative biofilm removal after treatment with varying-sized alumina nanoparticles (±SD; n=7) and indicate that alumina nanoparticles greater than 110 nm are less effective at removing *P. aeruginosa* biofilm than the 2 nm sized particle in 8676. The data trend seen along the serial dilution suggests a possible particle size dependency for effective biofilm removal when treated with active concentrations below 1000 ppm.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for removing a biofilm from a negatively charged surface comprising:

contacting a biofilm with a composition comprising (i) one or more positively charged aluminum chlorohydrate nanoparticles having an average particle size of from about 1 nm to about 110 nm and in the form of a colloid, and (ii) one or more of a biocide wherein the biocide is formaldehyde, glutaraldehyde, acrolein, a quaternary ammonium compound, a peroxycarboxylic acid, bronopol, isothiazolone, a carbamate, metronidazole, or a combination thereof, a scale inhibitor, corrosion inhibitor, anionic polymer, stabilizing agent, surfactant, hydrotrope, dispersant, solidification agent, aesthetic enhancing agent, wetting agent, defoaming agent, thickening agent, gelling agent, and solvent; and removing the biofilm from the surface, wherein the removing occurs by the one or more positively charged aluminum chlorohydrate nanoparticles interacting with the negatively charged surface, thereby disrupting biofilm adsorption to the negatively charged surface;

wherein the surface is located within a water system or water source, wherein the one or more positively charged aluminum chlorohydrate nanoparticles, when within the water system or water source have a concentration between about 0.1 ppm and about 2000 ppm and the biocide has a concentration of between about 0.1 wt-% to about 20 wt-%;

wherein the composition has a pH between about 6 and about 8; and wherein the composition does not include silica nanoparticles.

2. The method of claim 1, wherein the aluminum chlorohydrate nanoparticles have an average particle size from about 2 nm to about 110 nm.

3. The method of claim 1, wherein the aluminum chlorohydrate nanoparticles are in an aqueous dispersion at a concentration between about 0.5 ppm and about 1000 ppm.

4. The method of claim 1, wherein the aluminum chlorohydrate nanoparticles are applied in an aqueous dispersion at a concentration between about 1 ppm and about 62.5 ppm.

5. The method of claim 1, wherein the composition comprises from about 0.1 wt-% to about 20 wt-% of the biocide, from about 0.1 wt-% to about 20 wt-% of the aluminum chlorohydrate nanoparticles, and water.

6. The method of claim 1, wherein the composition comprises from about 1 wt-% to about 15 wt-% of the biocide, from about 1 wt-% to about 15 wt-% of the aluminum chlorohydrate nanoparticles, and water.

7. The method of claim 1, wherein the composition comprises from about 5 wt-% to about 10 wt-% of the biocide, from about 5 wt-% to about 10 wt-% of the aluminum chlorohydrate nanoparticles, and water.

8. The method of claim 1, wherein the water system or water source is one or more of the following: oil field drilling fluids and muds; petroleum recovery processes; mining pipelines; pipelines containing water; fire water; industrial lubricants; cutting fluids; heat transfer systems; cooling towers; gas scrubber systems; latex systems; clay and pigment systems; cooling system; cooling towers; food, beverage and industrial process waters; pulp and paper mill systems; brewery pasteurizers; sweetwater systems; air washer systems; decorative fountains; water intake pipes; ballast water tanks; and ship reservoirs.

9. The method of claim 8, wherein the water system or water source is not a water system or water source in need of purification, wherein the water system or water source is not treated with a filter in addition to the aluminum chlorohydrate nanoparticles, or wherein the water system or water source is not a water system or water source in need of purification nor is it treated with a filter in addition to the aluminum chlorohydrate nanoparticles.

10. The method of claim 1, wherein the biofilm comprises one or more of *Escherichia coli, Pseudomonas aeruginosa, Staphylococcal bacteria, Enterobacteriaceae bacteria*, and *Streptococcus bacteria.*

11. The method of claim 1, wherein the aluminum chlorohydrate nanoparticles further comprise one or more organic materials, inorganic materials, or a combination thereof.

12. The method of claim 11, wherein the aluminum chlorohydrate nanoparticles are mixed with the biocide, an additional functional ingredient, or a combination thereof to provide a disruption and removal of the biofilm.

* * * * *